(12) United States Patent
Jury

(10) Patent No.: US 9,243,372 B2
(45) Date of Patent: Jan. 26, 2016

(54) APPARATUS AND METHOD OF FLASH BUTT WELDING OF RAILWAY LINES

(71) Applicant: Brent Felix Jury, Waitara (NZ)

(72) Inventor: Brent Felix Jury, Waitara (NZ)

( * ) Notice: Subject to any disclaimer, the term of this patent is extended or adjusted under 35 U.S.C. 154(b) by 67 days.

(21) Appl. No.: 14/348,759

(22) PCT Filed: Oct. 11, 2012

(86) PCT No.: PCT/NZ2012/000182
§ 371 (c)(1),
(2) Date: Mar. 31, 2014

(87) PCT Pub. No.: WO2013/055233
PCT Pub. Date: Apr. 18, 2013

(65) Prior Publication Data
US 2014/0231532 A1    Aug. 21, 2014

(30) Foreign Application Priority Data
Oct. 13, 2011   (NZ) .................................. 595740

(51) Int. Cl.
*B23K 11/04*   (2006.01)
*E01B 29/44*   (2006.01)

(52) U.S. Cl.
CPC ................. *E01B 29/44* (2013.01); *B23K 11/04* (2013.01); *B23K 11/046* (2013.01); *B23K 2201/26* (2013.01)

(58) Field of Classification Search
CPC .... B23K 11/04; B23K 11/046; B23K 11/043; B23K 2201/26; E01B 29/44
See application file for complete search history.

(56) References Cited

U.S. PATENT DOCUMENTS

| | | | | |
|---|---|---|---|---|
| 3,691,622 A * | 9/1972 | Takagi et al. | ............. | 228/114.5 |
| 3,732,613 A * | 5/1973 | Steigerwald | ................ | 228/112.1 |
| 4,304,977 A * | 12/1981 | Hanai et al. | ..................... | 219/97 |
| 5,697,545 A * | 12/1997 | Jennings et al. | ........... | 228/112.1 |
| 6,131,801 A * | 10/2000 | Hagen | ......................... | 228/234.3 |
| 6,207,920 B1 * | 3/2001 | Morlock | ......................... | 219/54 |
| 6,852,940 B1 * | 2/2005 | Muhlleitner | ..................... | 219/55 |
| 2006/0016858 A1 * | 1/2006 | Statnikov et al. | ............. | 228/101 |
| 2006/0091186 A1 * | 5/2006 | Pfeiler | ......................... | 228/114.5 |
| 2010/0051585 A1 * | 3/2010 | Battisti et al. | ................... | 219/55 |
| 2010/0155372 A1 * | 6/2010 | Battisti et al. | ................... | 219/55 |
| 2010/0243715 A1 * | 9/2010 | Jury | .............................. | 228/171 |
| 2012/0015212 A1 * | 1/2012 | Karimine et al. | ............. | 428/681 |
| 2012/0234806 A1 * | 9/2012 | Saita et al. | ............... | 219/121.64 |
| 2014/0182803 A1 * | 7/2014 | Thuru et al. | ..................... | 164/54 |
| 2014/0231532 A1 * | 8/2014 | Jury | .............................. | 238/164 |

FOREIGN PATENT DOCUMENTS

GB       244155 A      12/1925
GB       1464847 A1    2/1977

\* cited by examiner

*Primary Examiner* — Jason C Smith
(74) *Attorney, Agent, or Firm* — Bio Intellectual Property Services LLC

(57) ABSTRACT

This invention relates to a flash butt welding process for joining sections of a railway line using vibration apparatus, the process including configuring and attaching a vibration apparatus on the railway line such that a vibration means is attachable to the railway line, and controlled vibration of the railway line at a suitable low frequency of vibration and amplitude of vibration, and then welding sections of railway line together using a flash butt welding means, and applying vibration to the sections of railway line until the flash butt weld is complete, and applying a controlled vibration to the welded sections of railway line for a period of time sufficient to allow for heat to dissipate from the weld area, and to allow for the weld area to be stress relieved for an improved weld joint.

9 Claims, 1 Drawing Sheet

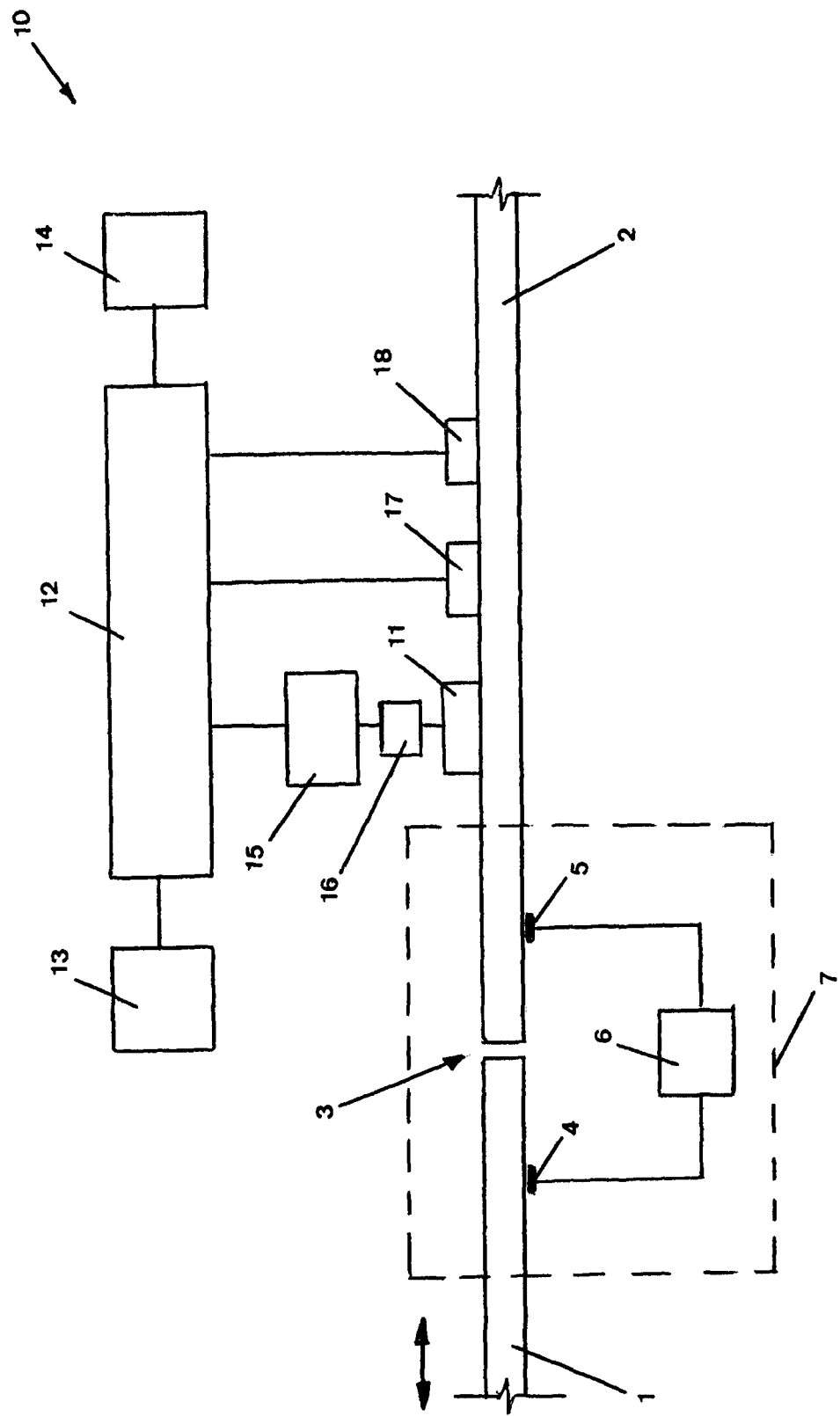

APPARATUS AND METHOD OF FLASH BUTT WELDING OF RAILWAY LINES

TECHNICAL FIELD

This invention relates to welding railway lines using controlled vibration in association with a flash butt welding process More particularly, but not exclusively, the present invention relates to an improved flash butt welding vibration method and system applied to axially join the ends of sections of railway line.

BACKGROUND ART

Railway lines are generally made of standard or high carbon steel as it is considered a durable and hard wearing material. In recent years, the carbon content of railway lines has increased for added durability, amongst other reasons, and is generally at about 0.8 and 1% carbon content. However, this increased carbon content has made it more difficult to successfully weld joins or joints between sections of railway line in applications where the newly welded joints must endure heavy axle loadings from trains and carriages laden with goods. Further, the addition of a small amount of chromium in some rail lines being manufactured has also made welding of rail lines more difficult as uneven welding joints have been observed.

The techniques for joining and rejoining sections of railway line have come under intense pressure in recent years as a result of rail failures sustained, in part, by heavy axle loadings, and concerns over the reliability of track repairs is being further compounded by such heavier loadings being exerted on railway lines.

As some railway lines endure extreme weather environments that can rapidly expand or compress lines along with heavy axle loadings, even these high carbon steel lines suffer the risk of cracking, buckling and joint failures from time to time. The consequences of track failure can lead to catastrophic derailments leading to loss of life and damage to property.

Therefore, the integrity of railway lines is considered to be essential for the safe carriage of persons and property across countries, and therefore the present invention is aimed at, inter alia, addressing these concerns.

It is a non-limiting object of the invention to provide an improved flash butt welding process for joining ends of a railway line which overcomes at least some of the abovementioned problems, or at least to provide the public with a useful choice.

It is also a non-limiting object of the invention to provide vibration apparatus for carrying out the improved flash butt welding process for joining ends of a railway line which overcomes at least some of the abovementioned problems, or at least to provide the public with a useful choice.

SUMMARY OF THE INVENTION

According to a first aspect of the invention there is provided a flash butt welding process for joining axially aligned sections of railway line, the process including the step of:
A.) aligning the sections of railway line axially using alignment clamping means, and attaching a vibration apparatus on the railway line, and vibrating the line at a low frequency of vibration and amplitude of vibration, such inputs being preset and are adjustable during the process by a vibration control means adapted to measure the frequency and amplitude of vibration;
B.) welding sections of aligned railway line together using a flash butt welding means and by applying electrical current to the sections of railway line and raising the temperature of the line to a suitable temperature, and longitudinally separating and then flashing and forging by pressing together the ends of the railway line with force, and applying vibration to the sections of railway line until the flash butt weld is complete; and after releasing the clamping means
C.) applying vibration to the welded sections of railway line for a period of time sufficient to allow heat to dissipate from the weld area, and to allow for the weld area to be stress relieved.

Preferably in step C. the vibration apparatus applies a controlled vibration about the weld area for a period of between 5 to 25 minutes after welding is completed.

Desirably in step C. the vibration apparatus applies a controlled vibration to the weld area for a period of between 5 to 25 minutes after a pause for 5 minutes upon release of the clamping means about the welded sections of railway line.

Preferably in step A. the vibration apparatus includes a vibration means being a motor provided with eccentric weights applied to the shaft of the motor, and wherein the motor is clampable to a section of railway line adjacent the weld area.

Desirably the frequency of vibration is measured by a tachometer means being releasably attachable to the railway line, and the amplitude of vibration is preferably measured by a velocity meter or an accelerometer means being releasably attachable to the railway line, the tachometer means and the velocity meter or the accelerometer means being adapted to provide feedback signals to the vibration control means.

Broadly, in step A. the frequency of vibration applied by the vibration apparatus is between about 50 Hertz and 800 Hertz. More particularly and preferably the frequency of vibration is between about 85 to 90 Hertz and the amplitude of vibration is between about 0.5 millimeters to about 2 millimeter per second.

Preferably the amplitude of vibration applied is about 0.5 millimeters per second.

According to a second aspect of the invention there is provided a flash butt welding vibration apparatus for carrying out a flash butt welding process for joining axially aligned sections of railway line, the vibration apparatus being configured and arranged with a flash butt welding apparatus, the vibration apparatus including a control means configured and arranged with a vibration means adapted to apply a vibration on the railway line before, during and after welding, the control means controlling operation of an accelerometer means associated therewith, and a temperature means providing readings to the control means.

BRIEF DESCRIPTION

Preferred and alternative embodiments of the invention will now be illustrated, by way of non-limiting example only, with reference to the accompanying drawing in which:
FIG. 1: Shows a schematic diagram of vibration apparatus configured for use on sections of railway line being joined by flash butt welding according to a preferred embodiment of the invention.

DETAILED DESCRIPTION

Referring to FIG. 1, an arrangement of main components of a vibrating apparatus 10 for use in forming an improved flash butt weld process on sections of railway line 1, 2 being welded together, according to one non-limiting embodiment of the invention, is illustrated.

A steel railway line generally includes a carbon content, and in many installations, a railway line is formed of a high carbon steel having a carbon content at about 0.8 and 1% of the overall composition. It is seen in this process that vibration may serve to control the movement of carbon in the steel structure during the welding process that is a desirable attribute of the unique process. Advantageously, it is considered that the apparatus and process of the invention can desirably improve the mechanical strength, and may increase the working life, of the weld. The advantageous result of this additional process can be an increase in the effective axle loading of the railway lines where flash butt welds have been effected.

Some railway lines include chrome as a part of its composition. In railway lines, known as chrome rail, about 0.25 to 0.55% by weight of chrome is included in the steel sections of line. These types of chrome rails have been problematic with welding joints to allow for heavier axle loadings over 40 tonnes, and it has been seen that the method of the present invention using vibration apparatus can increase the likelihood of forming a reliable weld joint between two sections of chrome rail and/or high carbon steel lines, and thus can allow such a welded joint to withstand higher axle loadings without undue fatigue or failure.

The welding process of the invention involves a method and associated apparatus for the application of vibration to sections of a railway line 1 and/or line 2 undergoing a flash butt welding process.

In FIG. 1, two sections of railway line 1,2 to be welded together are suitably prepared and aligned axially end to end. It is important to align the sections of rail line 1,2. The weld area 3 is indicated between and at the ends of the sections of line 1,2. The ends can be advantageously cut to shape, and/or be brushed and burned with a gas torch or otherwise as required to form a desirable end face or surface for welding, and for allowing heating to occur evenly over the end faces to be welded together. A distance or gap of desirably 40 to 60 mm between the end sections of railway line is desirably employed at the preheating stage.

Any suitable known form of flash butt welding apparatus or machine, referred to as a flash box 7, is set up about the sections of railway line 1, 2, and one example as seen is positioned over lines 1, 2. It will be appreciated by one skilled in the art that typical flash butt welding equipment and apparatus is readily available for current purposes. All published information on flash butt welding apparatus and techniques is incorporated in this description and further references to details of known and published techniques do not need to be further disclosed herein.

The flash butt welding apparatus in the form of a flash box 7 typically includes electrodes 4,5 firmly clampable to respective sides of the lines 1, 2 for supplying power through the sections of railway line 1, 2 to be welded. The electrodes can be connected to a suitable power supply means 6 being suitably controlled, in use, to apply current of typically between about 100 to 300 Amperes through the sections of railway line 1, 2 and across the gap between the ends of the sections of railway lines 1,2.

The temperature of the rail lines 1, 2 is increased to about 1100 degrees Celsius in and about the weld joint area 3 for pre-heating, flashing, and upsetting/forging stages of the welding process, or as required. The flash box 7 could apply typically between about 50 to 90 tonnes of force or more as suitable for welding the steel or high carbon steel and/or chrome steel ends of sections of railway line, as required. It is seen that the present invention can be employed for welding chrome rail and high carbon steel rail, which types of rail are generally considered to be difficult to flash butt weld with very high levels of success.

A means to axially separate one section of railway line from the other line, and press the sections 1, 2 together at high pressure or high force, is incorporated, and commonly at least one moving platen for reciprocal movement of one section of railway line 1 relative to the other fixed section of railway line 2 to be welded, can be employed.

The present invention desirably includes a controlled means of vibrating the railway lines 1, 2 in the form of suitable vibration apparatus or equipment 10 set up on the railway line 1,2 in association with the flash box 7, to supply a constant and suitable vibration before, during, and after welding takes place. The vibration means 11 is mountable by any known and suitable securing means, such as by clamping, bolting or screwing or otherwise as suitable, to a suitable position on the sections of railway line 1 and/or 2 or frame of the flash box 7, and is seen in FIG. 1 being releasably clampable to the area about the head of the section of railway line 2. The vibration means 11 can be bolted to a suitable position on the framework of the flash box 7 which can be seen to advantageously decrease the time required to reposition the equipment when multiple weld joints are required on a rail line.

The vibration apparatus 10 desirably includes a controlled source of vibration by way of a vibration means preferably being a shaker desirably in the form of eccentric weights in the form of a shaker means 11 configured and mounted on the line 1 and/or 2, and preferably being preset to vibrate and apply at least a 0.5 mm per second amplitude of vibration on the railway line at the start of the vibration process being applied. More desirably an amplitude of vibration or velocity of about 1 mm per second may be applied or increased from the lower vibration level in some applications, and this amplitude of vibration can optionally increase to about 2 mm/second as required. It is envisaged that the amplitude of vibration can vary depending on factors such as the proximity of the vibration means and to the weld area, and is preferably preset to avoid a failed weld joint occurring.

In a non-limiting application, the vibrator or shaker means 11, referred to herein as a shaker, can be mounted to any suitable part of the railway line, and preferably the head of a rail at a distance that applies a suitable velocity, and given the weight of the rail being welded, whether a 52 kg, 60 kg or 68 kg rail, or otherwise. The shaker 11 can be adapted with different types of eccentric weights as required, and can be movable on the rail so as to be set and apply at least the minimal velocity as required for applications, and bearing in mind that some flash boxes 7 require a larger weld area for operational purposes, and therefore the minimum distance the shaker 11 can be mounted to a rail may be greater than desired, and therefore a larger eccentric weight, and applied velocity, is required for carrying out the process of the invention.

The vibration apparatus 10 advantageously includes a control means 12 preferably including a computer means including a microprocessor, the computer means being suitably programmed to control the operation of main components of the vibration apparatus. A suitable display means 13 associated with the control means 12 is desirably utilised to enable an operator to read measurements and to ensure a suitable frequency and duration of vibration is applied to the sections of railway line 1,2 before, during, and after the welding process, as required. It is seen that the process can involve controlling various time periods for applying vibration to the sections of railway line 1,2 depending on the application.

The control means 12 is configured and arranged to control each step of the vibration process when the flash butt welding process is taking place. The control means 12 can desirably be powered by any power supply means 14 and when used remotely may be powered by any suitable and durable battery means (not shown) or power generator means for remote testing on railway lines from an available mains electrical power source or otherwise, thus enabling the vibration apparatus to be used for portable applications. Optionally a rechargeable power supply means can be configured and arranged with the vibration apparatus of the invention, and the rechargeable power supply means can include a solar cell charging means (not shown) as will be appreciated by a person skilled in the art.

Desirably the vibration apparatus includes a motor 15 adapted with a vibration inducement means optionally in the form of eccentric weights 11 mounted to the motor shaft of the motor 15 that, in use, applies vibration on the line 2 as seen in FIG. 1. Such force is adjustable such that the amplitude of vibration and the frequency of vibration can be changed or controllable by the control means 12. It is seen that the vibration means is desirably controlled by a user controlling and adjusting the speed of the motor 15. The motor 15 can therefore be controlled by operating a speed control adjustment means from the control means 12.

The motor speed of the vibration means can be sensed using any known form of motor speed measuring means and in this embodiment is in the form of a tachometer 16 that is mounted to the shaft of the motor 15. The tachometer 16 is configured and arranged to measure the motor shaft speed, and the measured signal outputs are fed to the control means 12.

The amplitude of vibration induced on a section of railway line 2 can be sensed and measured using a signal measuring means or transducer means, desirably an accelerometer, vibration meter or a velocity meter 17. A vibration meter can also measure frequency, displacement, velocity as understood by a person skilled in the art.

The accelerometer 17 generates an electrical signal in response to the vibration acceleration of the railway line as induced by the shaker 11, and provides a signal that is fed to the control means 12. The control means 12 is configured and arranged to convert the signals into a measurement of frequency of vibration for display on the display means 13. Typically the amplitude of vibration is preferably at least about 0.5 mm millimeter per second although it is envisaged that the vibrating apparatus 10 can be adapted to provide a desirable amplitude of vibration up to about 2 mm per second.

If a velocity meter 17 is applied, it is advantageously considered a suitably accurate meter for measuring acceleration, velocity and displacement. Further, the measurements can be fed to the control means 12 using any standard interface or by any known connection or interface means, including an RS-232 cable or similar, or more preferably via a USB cable. It will be appreciated that any known forms of cabling and connectors can be applied to connect and interface between main components of the present invention, and communications devices can include wired and wireless options as required or desired.

A temperature measurement means 18 is preferably used to measure the temperature of the line 2 during operation. The temperature measurement means 18 is desirably or optionally in the form of a pyrometer and provides measurement signals to the control means 12 that allows the temperature of the line to be tagged against other recorded data at the time of operation of the vibration apparatus 10.

The display means 13 can be adapted to provide plotted measurements of velocity amplitude (for example, in mm/second) against the frequency of vibration (in Hertz) and any other desirable characteristics of the data obtained during operation of the vibration apparatus 10 during the flash butt welding operation, and especially for a period of time after the flashing and forging stage of joining the ends of the line 2 to line 1.

The vibration apparatus 10 is configured and arranged to allow a user to apply a constant vibration to the railway line 2, and more particularly to the heat affected zone (HAZ) about the weld area 3, at any suitable frequency of vibration, and a preferred frequency of vibration may be substantially between about 50 to 800 Hz. More preferably, the frequency of vibration is set is between about 85 to 90 Hz. It can be desirable to control the vibration parameters by adjusting the frequency and amplitude of vibration during the welding process, in a manner that optimises the desired result of forming an improved flash butt weld joint.

It is envisaged in one application of the invention that the vibration apparatus 10 will be operated at the start of the welding operation, and will continue for a suitable time period after welding is complete, and is desirably applied for a period of between 5 to 25 minutes or more after the flash butt welding process has been completed. It is also optionally desirable to stop vibration stress relieving of the newly welded joint for about 5 minutes after the clamping means is released from the railway lines so as to avoid any rapid cooling for the short period of time, after which time the vibration is re-applied for stress relieving and cooling of the new weld joint, and other advantages as expressed in the present description of the invention.

Other periods of time are envisaged within the scope of the invention, the time periods being partially dependent on the time taken for heat to be dissipated from the newly flash butt welded heat affected area or HAZ.

The carbon steel railway line join in the weld area 3 is vibrated or pulsed constantly for a further period of time until stress relieving of the joint or the weld area 3 has occurred. This period of time may be for about 25 to 30 minutes, or otherwise as required.

It is anticipated that the flash butt weld will be improved and strengthened as a result of the apparatus and process of the present invention, and further, it may be that the increased durability of the weld will reduce the likelihood of cracking, or failure of the weld joint by fatigue cracks, especially when the railway line is under constant heavy axle loadings.

The present invention can have the advantage of reducing residual stress in the weld joint, aid in the fusion process, decrease poor weld procedures, and control the re-solidification of the weld meld. The strengthened weld could have the advantage of desirably increasing the axle loadings on a railway line to about 37 tonnes, and even maybe up to about 45 to 50 tonnes as line infrastructure allows, and with considering sleeper and base design, rail bridge constructions, or otherwise.

It is considered that the vibration may well effect the thermodynamic properties of the sections of railway line 1, 2. It may be seen that the grain structure of the rail becomes more refined, and a greater mechanical strength with the weld joint could be achieved.

It will be appreciated that in circumstances where the sections of line 1,2 being joined are of different grades of steel, the welding procedures and consumables employed are those specified for the harder grade of railway line being welded.

It will also be appreciated that the process of the invention can be applied to sections of railway line in situ or to sections railway lines in an engineering workshop or at any location, and an advantage of such vibration apparatus and equipment according to the invention is that it can be constructed as a portable kit, and such vibrating equipment can be easily transported on location where the railway line requires flash butt welding to take place.

Wherein the aforegoing reference has been made to integers or components having known equivalents, then such equivalents are herein incorporated as if individually set forth. Accordingly, it will be appreciated that changes may be made to the above described embodiments, variants, and alternatives of the process and other aspect so the present invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A flash butt welding process for joining axially aligned sections of railway line, the ends of the aligned sections of railway line forming a weld area, the process including the step of:
   a. aligning the sections of railway line axially using alignment clamping means, and attaching a vibration apparatus on the railway line, the vibration apparatus including a vibration control means and a vibration means, the vibration control means being configured and arranged to control a frequency of vibration and amplitude of vibration being applied by the vibration means to the sections of railway line, the vibration control means receiving signals from a frequency of vibration measurement means, an amplitude of vibration measurement means, and a temperature measurement means, and vibrating the sections of railway line at a low frequency of vibration and amplitude of vibration, the frequency of vibration and amplitude of vibration being preset, and being adjustable during the process by the vibration control means;
   b. welding the ends of the aligned sections of railway line together using a flash butt welding means and by applying electrical current to the sections of railway line and raising the temperature of the line to an operating temperature, and longitudinally separating and then flashing and forging by pressing together the ends of the aligned sections of railway line with force, and applying vibration to the sections of railway line until the flash butt weld is complete; and after releasing the clamping-means,
   c. applying vibration to the welded sections of railway line for a period of at least 5 minutes after welding is completed to allow heat to dissipate from the weld area, and to allow for the weld area to be stress relieved.

2. A flash butt welding process according to claim 1 wherein the vibration apparatus applies a controlled vibration about the weld area for a period of between 5 to 25 minutes after welding is completed.

3. A flash butt welding process according to claim 1 wherein the vibration apparatus applies a controlled vibration to the weld area for a period of between 5 to 25 minutes after a pause for 5 minutes upon release of the alignment clamping means about the weld area.

4. A flash butt welding process according to claim 1 wherein the vibration means is a motor provided with eccentric weights applied to the shaft of the motor, and wherein the motor is clampable to a said section of railway line adjacent the weld area.

5. A flash butt welding process according to claim 1 wherein the frequency of vibration measurement means is a tachometer means being releasably attachable to the railway line, and the amplitude of vibration measurement means is a velocity meter or an accelerometer means being releasably attachable to the railway line, the tachometer means and the velocity meter or the accelerometer means being adapted to provide feedback signals to the vibration control means.

6. A flash butt welding process according to claim 1 wherein the frequency of vibration applied by the vibration apparatus is between about 50 Hertz and 800 Hertz.

7. A flash butt welding process according to claim 1 wherein the frequency of vibration is between about 85 to 90 Hertz, and the amplitude of vibration is between about 0.5 millimeters to about 2 millimeter per second.

8. A flash butt welding process according to claim 1 wherein the amplitude of vibration applied is about 0.5 millimeters per second.

9. A flash butt welding vibration apparatus for carrying out a flash butt welding process for joining axially aligned sections of railway line, wherein aligned ends of the sections of railway line will for a weld area, the vibration apparatus being configured and arranged in association with a flash butt welding apparatus, the vibration apparatus including a vibration control means and a vibration means, the vibration control means being configured and arranged to control a frequency of vibration and amplitude of vibration being applied by the vibration means to the railway line, the vibration control means receiving signals from a frequency of vibration measurement means, an amplitude of vibration measurement means, and a temperature measurement means, and to apply a constant vibration to the welded sections of railway line for a period of at least 5 minutes after welding is completed to allow heat to dissipate from the weld area, and to allow for the weld area to be stress relieved.

* * * * *